United States Patent
Whisnant et al.

(10) Patent No.: US 7,483,811 B2
(45) Date of Patent: Jan. 27, 2009

(54) OPTIMIZING BANDWIDTH AND POWER IN WIRELESS NETWORKS OF SMART SENSORS

(75) Inventors: Keith A. Whisnant, San Diego, CA (US); Kenny C. Gross, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/593,891

(22) Filed: Nov. 6, 2006

(65) Prior Publication Data

US 2007/0055476 A1 Mar. 8, 2007

Related U.S. Application Data

(63) Continuation-in-part of application No. 11/195,565, filed on Aug. 2, 2005, now Pat. No. 7,155,365.

(51) Int. Cl.
*G06F 3/00* (2006.01)

(52) U.S. Cl. .................. 702/179; 702/180; 702/188; 702/189

(58) Field of Classification Search .............. 702/178, 702/179, 181–183, 186, 189, 180, 188, 185; 370/355; 375/141; 700/3; 703/7
See application file for complete search history.

(56) References Cited

U.S. PATENT DOCUMENTS

| 6,892,163 | B1 * | 5/2005 | Herzog et al. | 702/181 |
| 6,975,962 | B2 * | 12/2005 | Wegerich et al. | 702/182 |
| 7,233,886 | B2 * | 6/2007 | Wegerich et al. | 703/2 |

* cited by examiner

*Primary Examiner*—Eliseo Ramos Feliciano
*Assistant Examiner*—Felix E Suarez
(74) *Attorney, Agent, or Firm*—Park, Vaughan & Fleming LLP (57) ABSTRACT

A system that uses statistical techniques to selectively transmit data from a sensor. During operation, the system receives a sequence of quantized values from the sensor. The system then determines whether a distribution for the sequence of quantized values indicates that the sensor is observing a real event. If so, the system transmits sensor data for the real event to a receiver.

12 Claims, 5 Drawing Sheets

OPTIMIZING BANDWIDTH AND POWER IN WIRELESS NETWORKS OF SMART SENSORS

RELATED APPLICATION

This application is a continuation-in-part of a pending U.S. patent application, entitled "Optimal Bandwidth and Power Utilization for Ad Hoc Networks of Wireless Smart Sensors," by inventors Kenny C. Gross, Becky X. Li, and Keith A. Whisnant, having Ser. No. 11/195,565 and a filing date of 02 Aug. 2005, now U.S. Pat. No. 7,155,365. This application hereby claims priority under 35 U.S.C. §120 to the above-listed patent application. Moreover, the above-listed application is hereby incorporated by reference.

BACKGROUND

1. Field of the Invention

The present invention relates to techniques for gathering information from sensors. More specifically, the present invention relates to a method and apparatus that uses statistical techniques to determine if a sensor in an ad hoc network is observing an interesting event which is worthwhile to transmit across the ad hoc network.

2. Related Art

"Smart motes" belong to class of integrated intelligent wireless sensors. These integrated intelligent wireless sensors typically include a number of components such as transducers, an operating system, and a central processing unit (CPU), which can preprocess sampled signals. Smart motes are quite useful because they can be organized into geographically distributed ad hoc networks, which can measure a wide range of physical variables such as: temperature, vibration, humidity, barometric pressure, radiation level, light, and sonar.

Figure 2:
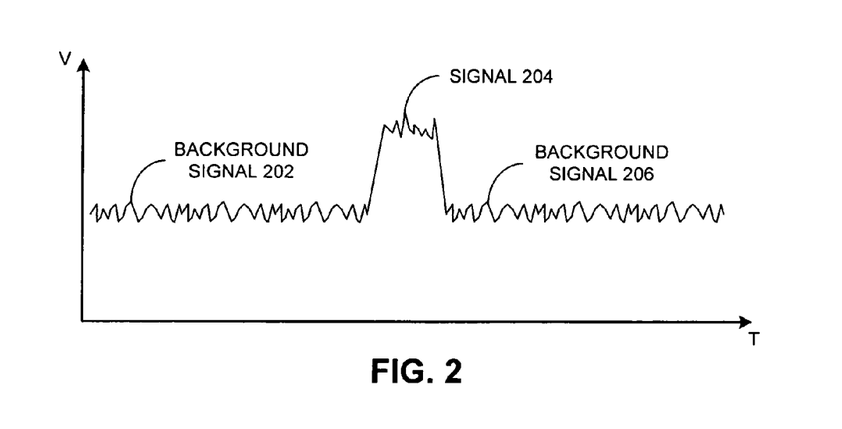
FIG. 2 illustrates a signal with background variations and a real event.

Many of the physical variables which are measured by smart motes are episodic in nature. Typically, there is some amount of normal background variation, which does not contain useful information. This background variation is interspersed with episodes of interesting events, which are characterized by elevated mean signal levels, increased burstiness, appearance of a trend in variables that are otherwise statistically stationary, or appearance of dynamic phenomena that distinguish the interesting events from the normal background variation. For example, FIG. 2 illustrates a signal with background variations and a real event. Background signals 202 and 206 are caused by background variations, whereas signal 204 is caused by a real event.

Although the smart motes can transmit data values continuously, doing so during uninteresting time periods wastes network bandwidth and battery power. One technique for using the bandwidth more effectively is to set thresholds for specific smart mote variables. If the measured level of a variable exceeds a threshold, the smart mote transmits the data. This "threshold-limit" technique suffers from two limitations:

1. It is difficult to decide where to set the threshold. For noisy processes, setting the threshold too low results in frequent "false-alarm" warnings. However, setting the threshold too high results in missing a real event.
2. The received data has gaps during the "uninteresting" times, but most pattern recognition techniques require uniformly sampled signals.

Hence, what is needed is a method and an apparatus for selectively transmitting data from a remote sensor, such as a smart mote.

SUMMARY

One embodiment of the present invention provides a system that uses statistical techniques to selectively transmit data from a sensor. During operation, the system receives a sequence of quantized values from the sensor. The system then determines whether a distribution for the sequence of quantized values indicates that the sensor is observing a real event. If so, the system transmits sensor data for the real event to a receiver.

In a variation on this embodiment, while determining whether the distribution indicates that the sensor is observing a real event, for each quantized value in the sequence of quantized values, the system updates a bin of a histogram that is associated with the quantized value to indicate that the quantized value was observed. Next, the system calculates a frequency for the bin. The system then determines whether the calculated frequency for the bin has deviated by a specified amount from a mean frequency for the bin. If so, the system determines that the sensor is observing a real event.

In a further variation, the system uses a Sequential Probability Ratio Test (SPRT) to determine whether the calculated frequency has deviated by the specified amount from the mean frequency.

In a further variation, the SPRT is applied to each bin in the histogram.

In a further variation, the SPRT can include one of more of: a positive mean test, which tests whether the mean of a time series for the inferential variable is above a reference level; a negative mean test, which tests whether the mean of the time series for the inferential variable is below a reference level; a nominal variance test, which tests whether the variance of the time series for the inferential variable is proportional to a scale factor; a inverse variance test, which tests whether the variance of the time series for the inferential variable is proportional to the inverse of the scale factor; a positive first difference test, which tests whether the time series for the inferential variable is increasing; a negative first difference test, which tests whether the time series for the inferential variable is decreasing; a positive first difference variance test, which tests whether the first difference of the variance of the time series is increasing; and a negative first difference variance test, which tests whether the first difference of the variance of the time series is decreasing.

In a further variation, prior to determining whether the calculated frequency has deviated by the specified amount from the mean frequency, the system determines the mean frequency and a variance for the quantized value by: (1) observing a sequence of quantized values associated with background variations during a training phase; and (2) for each observed quantized value, updating a bin of the histogram that is associated with the quantized value to indicate that the quantized value was observed, and calculating a mean frequency and a variance for the bin.

In a variation on this embodiment, the sensor is located on a smart mote, which measures and preprocesses physical variables, and transmits the resulting data wirelessly to a receiver.

BRIEF DESCRIPTION OF THE FIGURES

Table 1 presents exemplary values for a bin observed during a training process in accordance with an embodiment of the present invention.

Table 2 presents exemplary values for the bin presented in Table 1 during a monitoring process in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as 20 disk drives, magnetic tape, CDs (compact discs) and DVDs (digital versatile discs or digital video discs).

Smart Mote

Figure 1:
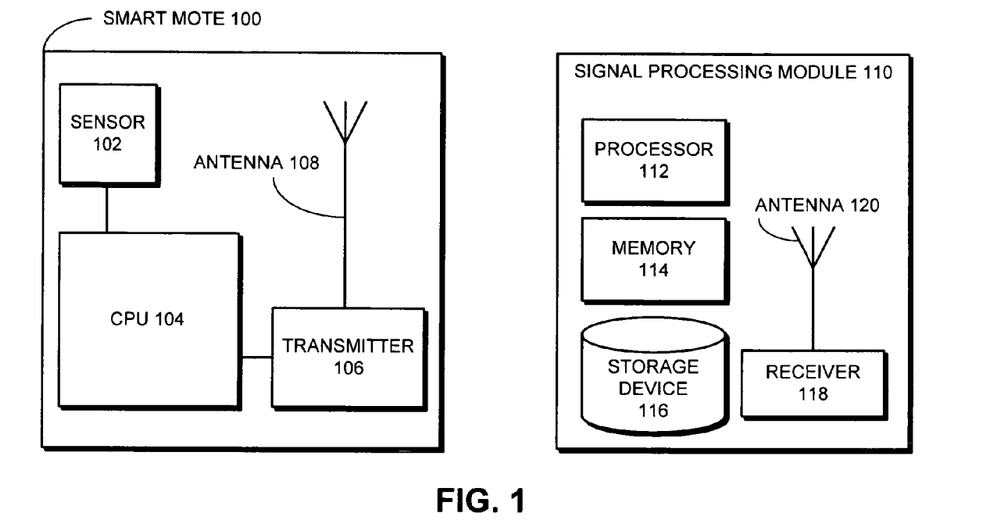
FIG. 1 presents a block diagram of a smart mote and a receiver in accordance with an embodiment of the present invention.

FIG. 1 presents a block diagram of smart mote 100 and signal processing module 110. Smart mote 100 contains sensor 102, CPU 104, transmitter 106, and antenna 108. Sensor 102 monitors physical variables and sends the resulting signal to CPU 104 for pre-processing. Transmitter 106 transmits the pre-processed signal using antenna 108 to one or more remote receivers. For example, smart mote 100 transmits the pre-processed signal to signal processing module 110, which includes processor 112, memory 114, storage device 116, receiver 118, and antenna 120. The transmitted signals are received by receiver 118 through antenna 120. The signals are then processed by processor 112.

Note that processor 112 can generally include any type of processor, including, but not limited to, a microprocessor, a mainframe computer, a digital signal processor, a personal organizer, a device controller and a computational engine within an appliance. Memory 114 can include any type of memory, including but not limited to, dynamic random access memory (DRAM), static random access memory (SRAM), flash memory, and read only memory (ROM). Storage device 116 can include any type of non-volatile storage device that can be coupled to a computer system. This includes, but is not limited to, magnetic, optical, and magneto-optical storage devices, as well as storage devices based on flash memory and/or battery-backed up memory.

Transmitting Side

One embodiment of the present invention improves the operation of smart motes by: (1) attempting to minimize bandwidth used by the smart motes; (2) attempting to minimize battery power used by the smart motes; and (3) attempting to eliminate gaps in data on the receiving end of transmission by the smart motes.

Instead of using a fixed threshold to decide when to transmit data, the present invention applies a sequential detection technique called the Sequential Probability Ratio Test (SPRT) to decide when the events monitored by the wireless sensors are "interesting." Note that the interesting events can include (1) a signal that comes from a distribution that has a higher or a lower mean than normal, or (2) a signal that has a larger or smaller level of variability than normal. Using a SPRT on the transmitting side has the following advantages:

1. The SPRT has user configurable false-alarm and missed-alarm probabilities (as opposed to threshold limits, which have a "seesaw" tradeoff between sensitivity and false alarms).
2. The SPRT has the mathematically shortest decision time for catching subtle anomalies in noisy process variables.

It is important to note that the SPRT is not compute intensive and is well-suited to operate on within the CPU constraints of the smart motes (the SPRT uses simple algebraic expressions).

Receiving Side

On the receiving side, during uninteresting times, large gaps in data can exist when the smart motes are not transmitting. The smart mote system generates synthetic observations adhering to a target distribution that has the same mean and variance as the parameter being monitored by the smart mote during the background activity time period for that variable. The distribution defaults to normal, Gaussian white noise. By definition, the data characteristics are less interesting during this time period, hence, a synthesis of background activity is adequate for pattern recognition algorithms that use the telemetry signals.

SPRT Implementation

The Sequential Probability Ratio Test is a statistical hypothesis test that differs from standard fixed sample tests. In fixed-sample statistical tests, a given number of observations are used to select one hypothesis from one or more alternative hypotheses. The SPRT, however, examines one observation at a time, and then makes a decision as soon as it has sufficient information to ensure that pre-specified confidence bounds are met.

The basic approach taken by the SPRT technique is to analyze successive observations of a discrete process. Let $y_n$ represent a sample from the process at a given moment $t_n$ in time. In one embodiment of the present invention, the sequence of values $\{Y_n\} = y_0, y_1, \ldots, y_n$ comes from a stationary process characterized by a Gaussian, white-noise probability density function (PDF) with mean 0. (Note that since with the sequence is from a nominally stationary processes, any process variables with a nonzero mean can be first normalized to a mean of zero with no loss of generality).

The SPRT is a binary hypothesis test that analyzes process observations sequentially to determine whether or not the signal is consistent with normal behavior. When a SPRT reaches a decision about current process behavior (i.e., the signal is behaving normally or abnormally), the system reports the decision and continues to process observations.

For each of the eight types of tandem SPRT tests described below, the signal data adheres to a Gaussian PDF with mean 0 and variance $\sigma^2$ for normal signal behavior, referred to as the null hypothesis, $H_0$. The system computes eight specific SPRT hypothesis tests in parallel for the variable monitored by each smart mote. One embodiment of the present invention applies a SPRT to a time-series with a Gaussian distribution. Another embodiment of the present invention applies a non-parametric SPRT to a time-series that does not adhere to a Gaussian distribution.

The SPRT surveillance module executes all 8 tandem hypothesis tests in parallel. Each test determines whether the current sequence of process observations is consistent with the null hypothesis versus an alternative hypothesis. The first four tests are: (SPRT 1) the positive-mean test, (SPRT 2) the negative-mean test, (SPRT 3) the nominal-variance test, and (SPRT 4) the inverse-variance test. For the positive-mean test, the signal data for the corresponding alternative hypothesis, $H_1$, adheres to a Gaussian PDF with mean +M and variance $\sigma^2$. For the negative-mean test, the signal data for the corresponding alternative hypothesis, $H_2$, adheres to a Gaussian PDF with mean −M and variance $\sigma^2$. For the nominal-variance test, the signal data for the corresponding alternative hypothesis, $H_3$, adheres to a Gaussian PDF with mean 0 and variance $V\sigma^2$ (with scalar factor V). For the inverse-variance test, the signal data for the corresponding alternative hypothesis, $H_4$, adheres to a Gaussian PDF with mean 0 and variance $\sigma^2/V$.

The next two tandem SPRT tests are performed not on the raw smart mote output variables as above, but on the first difference function of the variable. For discrete time series, the first difference function (i.e., difference between each observation and the observation preceding it) gives an estimate of the numerical derivative of the time series. During uninteresting time periods, the observations in the first difference function are a nominally stationary random process centered about zero. If an upward or downward trend suddenly appears in the signal, SPRTs number 5 and 6 observe an increase or decrease, respectively, in the slope of the variable.

For example, if there is a decrease in the value of the variable, SPRT alarms are triggered for SPRTs 2 and 6. SPRT 2 generates a warning because the sequence of raw observations drops with time. And SPRT 6 generates a warning because the slope of the variable changes from zero to something less than zero. The advantage of monitoring the mean SPRT and slope SPRT in tandem is that the system correlates the SPRT readings from the eight tests and determines if the signal is a real event. For example, if the signal levels off to a new stationary value (or plateau), the alarms from SPRT 6 cease because the slope returns to zero when the raw signal reaches a plateau. However, SPRT 2 will continue generating a warning because the new mean value of the signal is different from the value prior to the degradation. Therefore, the system correctly identifies a real event.

If SPRTs 3 or 4 generates a warning, the variance of the sensed variable is either increasing or decreasing, respectively. An increasing variance that is not accompanied by a change in mean (inferred from SPRTs 1 and 2 and SPRTs 5 and 6) signifies an episodic event that is "bursty" or "spiky" with time. A decreasing variance that is not accompanied by a change in mean is a common symptom of a failing component that is characterized by an increasing time constant.

Therefore, having variance SPRTs available in parallel with slope and mean SPRTs provides a wealth of supplementary diagnostic information.

The final two tandem SPRT tests, SPRT 7 and SPRT 8, are performed on the first difference function of the variance estimates for the smart mote variable. The first difference function of the variance estimates is a numerical approximation of the derivative of the sequence of variance estimates. As such, SPRT 7 triggers a warning flag if the variance of the variable is increasing, while SPRT 8 triggers a warning flag if the variance of the variable is decreasing. A comparison of SPRT alarms from SPRTs 3, 4, 7, and 8, gives a great deal of diagnostic information on a class of signals known collectively as a "change in gain without a change in mean." For example, if SPRTs 3 and 7 both trigger warning flags, it is an indication that there has been a sudden increase in the variance of the process. If SPRT 3 continues to trigger warning flags but SPRT 7 ceases issuing warning flags, it is an indication that the real event responsible for the increased noisiness has gone to completion.

Similarly, if SPRTs 4 and 8 both start triggering alarms, there is a decrease in variance for the process. If SPRT 4 continues to issue warning flags but SPRT 8 ceases issuing warning flags, it is an indication that the real event has gone to completion. In safety-critical processes, this mode (decreasing variance without a change in mean) is dangerous in conventional systems that are monitored only by threshold limit tests. The reason it is dangerous is that a shrinking variance, when it occurs as a result of a transducer that is losing its ability to respond, never trips a threshold limit. (In contrast degradation that manifests as a linear decalibration bias, or even an increasing variance, eventually trips a high or low threshold limit and sounds a warning). A sustained decreasing variance, which happens, for example, when oil-filled pressure transmitters leak their oil, or electrolytic capacitors leak their electrolyte, never trips a threshold in conventional systems, but will be readily detected by the suite of 8 tandem SPRT tests taught in this invention.

The SPRT technique provides a quantitative framework that permits a decision to be made between the null hypothesis and the eight alternative hypotheses with specified misidentification probabilities. If the SPRT accepts one of the alternative hypotheses, an alarm flag is set and data is transmitted. If all eight of the null hypotheses are met, it can be concluded with a high degree of confidence that the data represents normal background activity for the variable monitored by the smart mote.

The SPRT operates as follows. At each time step in a calculation, the system calculates a test index and compares it to two stopping boundaries A and B (defined below). The test index is equal to the natural log of a likelihood ratio ($L_n$), which for a given SPRT is the ratio of the probability that the alternative hypothesis for the test ($H_j$, where j is the appropriate subscript for the SPRT in question) is true, to the probability that the null hypothesis ($H_0$) is true.

$$L_n = \frac{\text{probability of observed sequence } \{Y_n\} \text{ given } H_j \text{ is true}}{\text{probability of observed sequence } \{Y_n\} \text{ given } H_0 \text{ is true}} \quad (1)$$

If the logarithm of the likelihood ratio is greater than or equal to the logarithm of the upper threshold limit [i.e., $\ln(L_n) > \ln(B)$], then the alternative hypothesis is true. If the logarithm of the likelihood ratio is less than or equal to the logarithm of the lower threshold limit [i.e., $\ln(L_n) < \ln(A)$], then the null hypothesis is true. If the log likelihood ratio falls between the two limits, [i.e., $\ln(A)<\ln(L_n)<\ln(B)$], then there is not enough information to make a decision (and, incidentally, no other statistical test could yet reach a decision with the same given Type I and II misidentification probabilities).

Equation (2) relates the threshold limits to the misidentification probabilities $\alpha$ and $\beta$:

$$A = \frac{\beta}{1-\alpha}, \qquad B = \frac{1-\beta}{\alpha} \qquad (2)$$

where $\alpha$ is the probability of accepting $H_j$ when $H_0$ is true (i.e., the false-alarm probability), and $\beta$ is the probability of accepting $H_0$ when $H_j$ is true (i.e., the missed-alarm probability).

The first two SPRT tests for normal distributions examine the mean of the process observations. If the distribution of observations exhibits a non-zero mean (e.g., a mean of either +M or −M, where M is the pre-assigned system disturbance magnitude for the mean test), the mean tests determine that the system is degraded. Assuming that the sequence $\{Y_n\}$ adheres to a Gaussian PDF, then the probability that the null hypothesis $H_0$ is true (i.e., mean 0 and variance $\sigma^2$) is:

$$P(y_1, y_2, \ldots, y_n \mid H_0) = \frac{1}{(2\pi\sigma^2)^{n/2}} \exp\left[-\frac{1}{2\sigma^2}\sum_{k=1}^{n} y_k^2\right] \qquad (3)$$

Similarly, the probability for alternative hypothesis $H_l$ is true (i.e., mean M and variance $\sigma^2$) is:

$$P(y_1, y_2, \ldots, y_n \mid H_1) = \qquad (4)$$
$$\frac{1}{(2\pi\sigma^2)^{n/2}} \exp\left[-\frac{1}{2\sigma^2}\left(\sum_{k=1}^{n} y_k^2 - 2\sum_{k=1}^{n} y_k M + \sum_{k=1}^{n} M^2\right)\right]$$

The ratio of the probabilities in (3) and (4) gives the likelihood ratio $L_n$ for the positive-mean test:

$$L_n = \exp\left[-\frac{1}{2\sigma^2}\sum_{k=1}^{n} M(M - 2y_k)\right] \qquad (5)$$

Taking the logarithm of likelihood ratio given by (5) produces the SPRT index for the positive-mean test (SPRT$_{pos}$):

$$SPRT_{pos} = -\frac{1}{2\sigma^2}\sum_{k=1}^{n} M(M - 2y_k) = \frac{M}{\sigma^2}\sum_{k=1}^{n}\left(y_k - \frac{M}{2}\right) \qquad (6)$$

The SPRT index for the negative-mean test (SPRT$_{neg}$) is derived by substituting −M for each instance of M in (4) through (6) above, resulting in:

$$SPRT_{neg} = \frac{M}{\sigma^2}\sum_{k=1}^{n}\left(-y_k - \frac{M}{2}\right) \qquad (7)$$

The next two SPRT tests examine the variance of the sequence. This capability gives the SPRT module the ability to detect and quantitatively characterize changes in variability for processes, which is vitally important for 6-sigma QA/QC improvement initiatives. In the variance tests, the system is degraded if the sequence exhibits a change in variance by a factor of V or 1/V, where V, the pre-assigned system disturbance magnitude for the variance test, is a positive scalar. The probability that the alternative hypothesis $H_3$ is true (i.e., mean 0 and variance $V\sigma^2$) is given by (3) with $\sigma^2$ replaced by $V\sigma^2$:

$$P(y_1, y_2, \ldots, y_n \mid H_0) = \frac{1}{(2\pi V\sigma^2)^{n/2}} \exp\left[-\frac{1}{2V\sigma^2}\sum_{k=1}^{n} y_k^2\right] \qquad (8)$$

The likelihood ratio for the variance test is given by the ratio of (8) to (3):

$$L_n = V^{-n/2}\exp\left[-\frac{1}{2\sigma^2}\frac{1-V}{V}\sum_{k=1}^{n} y_k^2\right]. \qquad (9)$$

Taking the logarithm of the likelihood ratio given in (9) produces the SPRT index for the nominal-variance test (SPRT$_{nom}$):

$$SPRT_{nom} = \frac{1}{2\sigma^2}\left(\frac{V-1}{V}\right)\sum_{k=1}^{n} y_k^2 - \frac{n}{2}\ln V \qquad (10)$$

The SPRT index for the inverse-variance test (SPRT$_{inv}$) is derived by substituting 1/V for each instance of V in (8) through (10), resulting in:

$$SPRT_{inv} = \frac{1}{2\sigma^2}(1-V)\sum_{k=1}^{n} y_k^2 + \frac{n}{2}\ln V \qquad (11)$$

The tandem SPRT module performs mean, variance, and SPRT tests on the raw process signal and on its first difference function. To initialize the module for analysis of a smart mote variable, the user specifies the system disturbance magnitudes for the tests (M and V), the false-alarm probability ($\alpha$), and the missed-alarm probability ($\beta$).

Then, during the training phase (before the first failure of a component under test), the module calculates the mean and variance of the monitored variable process signal. For most variables the mean of the raw observations for the variable will be nonzero; in this case the mean calculated from the training phase is used to normalize the signal during the monitoring phase. The system disturbance magnitude for the mean tests specifies the number of standard deviations (or fractions thereof) that the distribution must shift in the positive or negative direction to trigger an alarm. The system disturbance magnitude for the variance tests specifies the fractional change of the variance necessary to trigger an alarm.

At the beginning of the monitoring phase, the system sets all eight SPRT indices to 0. Then, during each time step of the calculation, the system updates the SPRT indices using (6), (7), (10), and (11). The system compares each SPRT index is then compared to the upper [i.e., $\ln((1-\beta)/\alpha]$ and lower [i.e., $\ln((\beta/(1-\alpha))]$ decision boundaries, with these three possible outcomes:
1. the lower limit is reached, in which case the process is declared healthy, the test statistic is reset to zero, and sampling continues;
2. the upper limit is reached, in which case the process is declared degraded, an alarm flag is raised indicating a sensor or process fault, the test statistic is reset to zero, and sampling continues; or
3. neither limit has been reached, in which case no decision concerning the process can yet be made, and the sampling continues.

The advantages of using a SPRT are twofold:
1. early detection of very subtle anomalies in noisy process variables; and
2. pre-specification of quantitative false-alarm and missed-alarm probabilities.

The present invention uses tandem SPRTs to monitor "derivative SPRTs" in parallel with mean and variance SPRTs that are performed on the time series associated with the smart mote measured variable. The new tandem-SPRT approach facilitates determining the onset of interesting episodic events, saving both bandwidth and transmitter battery power during periods of normal background activity. During periods of normal background activity, the receiver agent generates synthesized observations that possess the same mean and variance as the original variable during its background activity period. Note that in addition to generating Gaussian data, they system can generate data which matches an empirical distribution.

Output from this invention may then be processed with standard pattern recognition algorithms that expect uniform, synchronous time series as input.

However, note that the SPRT technique assumes a Gaussian distribution. For a sensor that produces a quantized signal, the SPRT cannot be applied to the variable directly because the distribution of the quantized signal is not Gaussian. Hence, another technique for detecting changes in a quantized signal needs to be used. In one embodiment of the present invention, a "moving histogram" technique is used to detect changes in the distribution for a quantized signal. This moving histogram technique is described in more detail below.

Identifying Real Events

Figure 3:
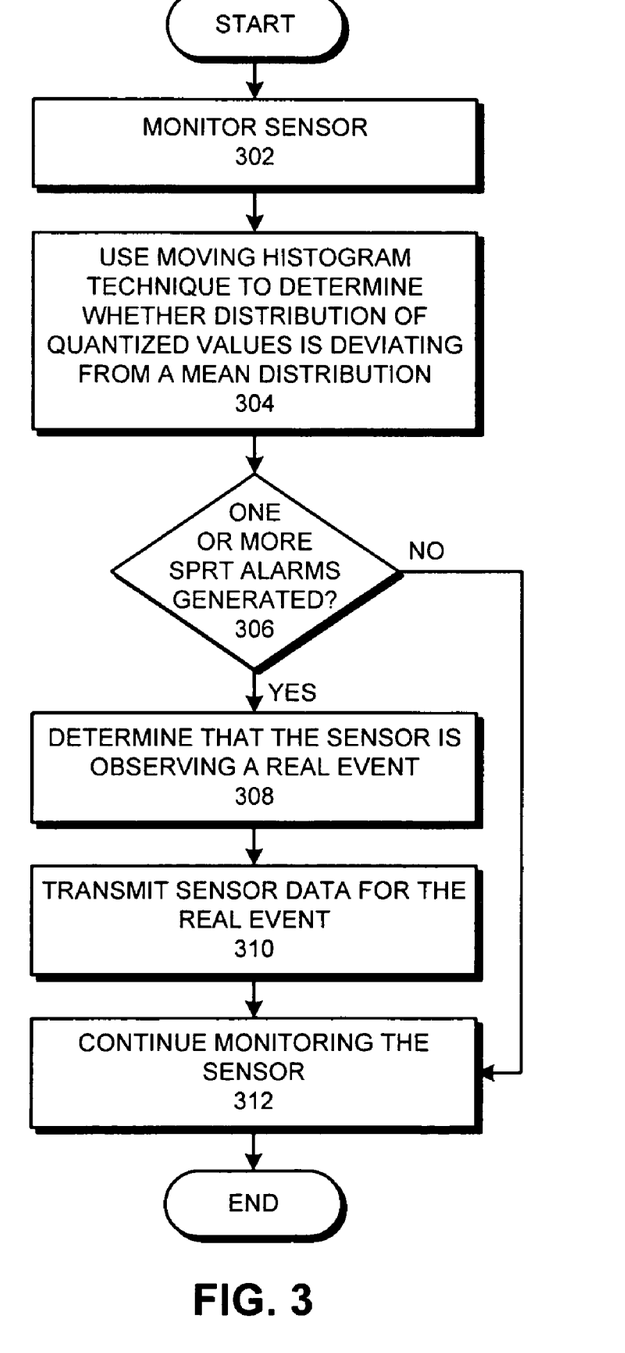
FIG. 3 presents a flow chart illustrating the process of determining if a sensor is observing a real event in accordance with an embodiment of the present invention.

FIG. 3 presents a flow chart illustrating the process of determining if a sensor is observing a real event in accordance with an embodiment of the present invention. During operation, the system monitors a sensor (step 302). Next, the system uses a moving histogram technique to determine whether a distribution of the quantized values is deviating form a mean distribution (step 304). (Step 304 is described in more detail with reference to FIGS. 5-7 below.) If one or more SPRT alarms are generated by the moving histogram technique (step 306—yes), the system determines that the sensor is observing a real event (step 308) and transmits sensor data for the real event to a receiver (step 310). The system then continues monitoring the sensor (step 312). If no SPRT alarms are generated (step 306—no), the system continues monitoring the sensor (step 312).

Moving Histogram Technique

If a signal associated with a physical variable of a computing system is capable of being reported without being quantized (e.g., without using an analog-to-digital converter), then conventional statistical pattern recognition techniques can be used to detect when the signal starts to drift from a stationary distribution. However, if the signal is quantized, these statistical pattern recognition techniques cannot directly be used to detect drift in the signal.

To overcome this problem, one embodiment of the present invention uses a "moving histogram" to detect changes in a quantized signal. In this embodiment, a moving histogram is created and updated over time by: (1) sampling a quantized value; (2) assigning the quantized value to a bin for that quantized value; and (3) determining a frequency or percentage of sampled quantized values that are of the bin value.

Figure 4:
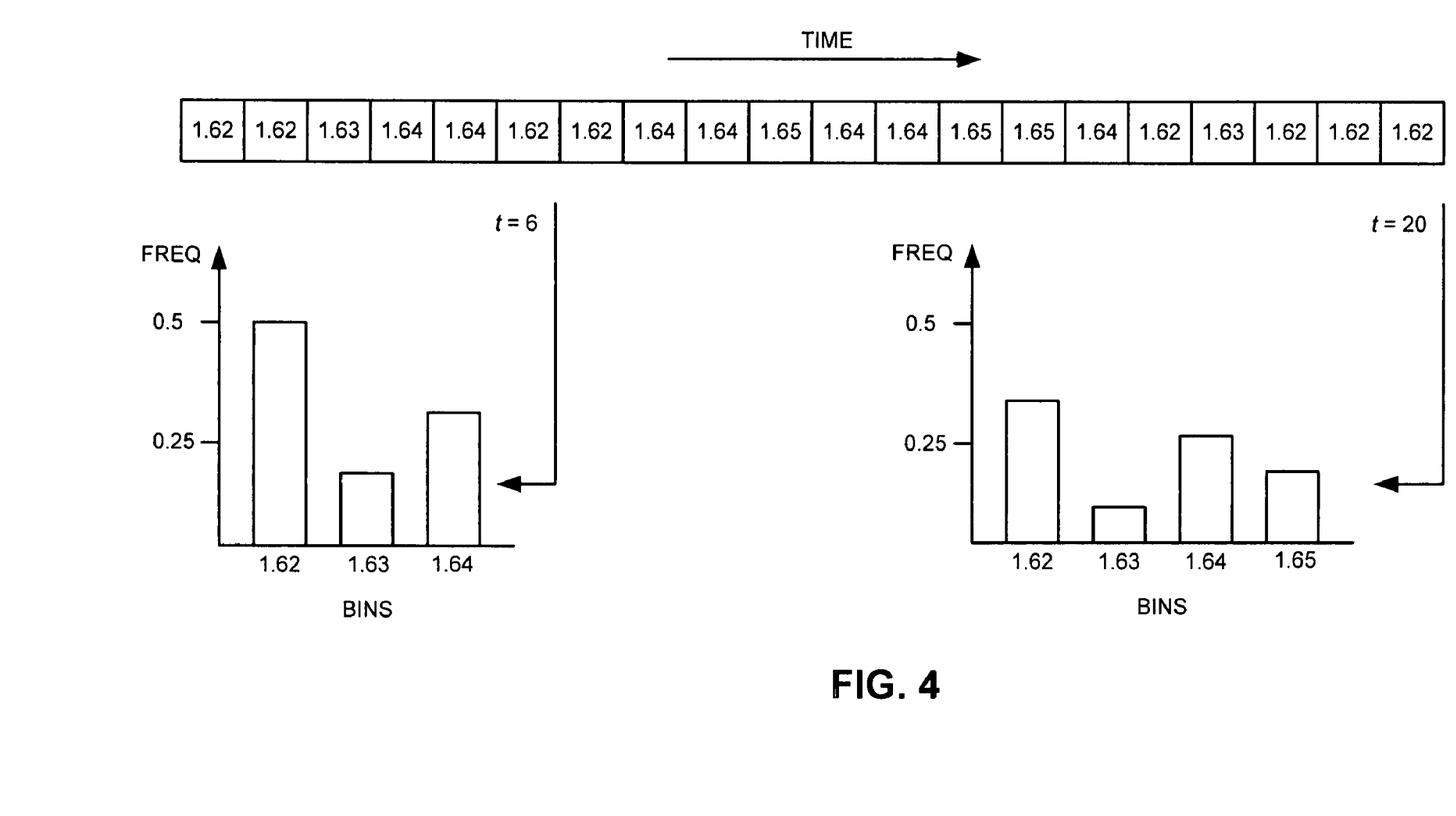
FIG. 4 illustrates an exemplary moving histogram technique in accordance with an embodiment of the present invention.

FIG. 4 illustrates an exemplary moving histogram technique in accordance with an embodiment of the present invention. In FIG. 4, a quantized value is sampled at every time unit t, where every t unit is represented by one block. At t=6, six quantized values have been sampled, and the moving histogram includes the following set of (bin, frequency) pairs: (1.62, 0.5), (1.63, 0.167), (1.64, 0.333). After each quantized value is sampled (or after every n samples), the distribution of values in the moving histogram is updated. For example, as shown in FIG. 4, at t=20, the moving histogram includes the following set of (bin, frequency) pairs: (1.62, 0.4), (1.63, 0.1), (1.64, 0.3), (1.65, 0.2).

Figure 5:
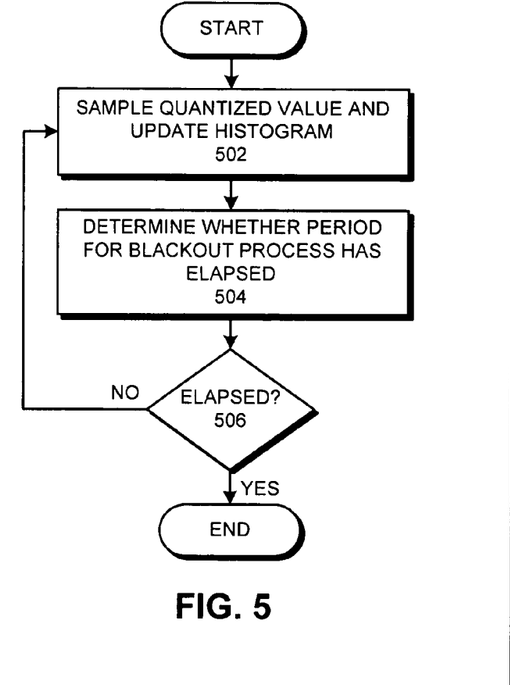
FIG. 5 presents a flowchart illustrating a "blackout" process wherein the distribution of the signal is stabilized in accordance with an embodiment of the present invention.
Figure 6:
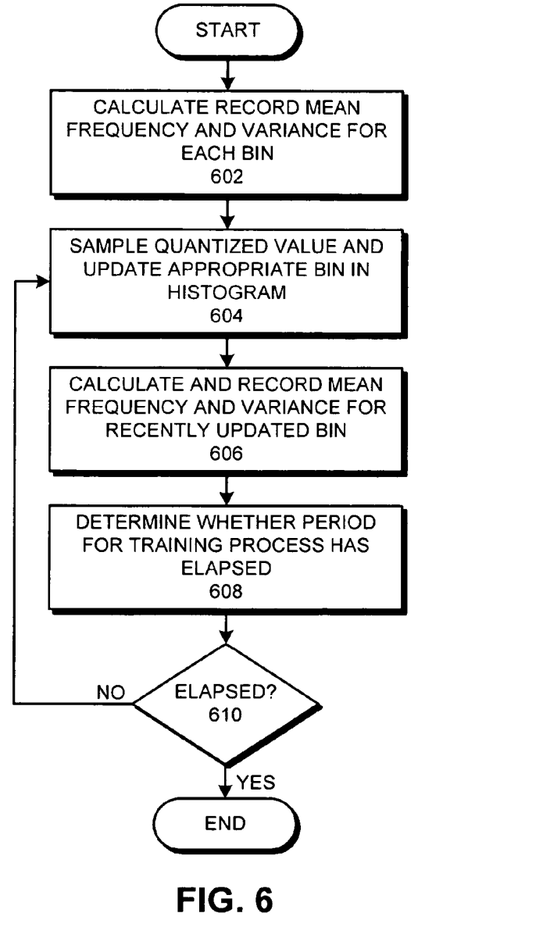
FIG. 6 presents a flowchart illustrating a "training" process wherein the mean frequencies and the variances for the bins of the moving histogram are determined in accordance with an embodiment of the present invention.
Figure 7:
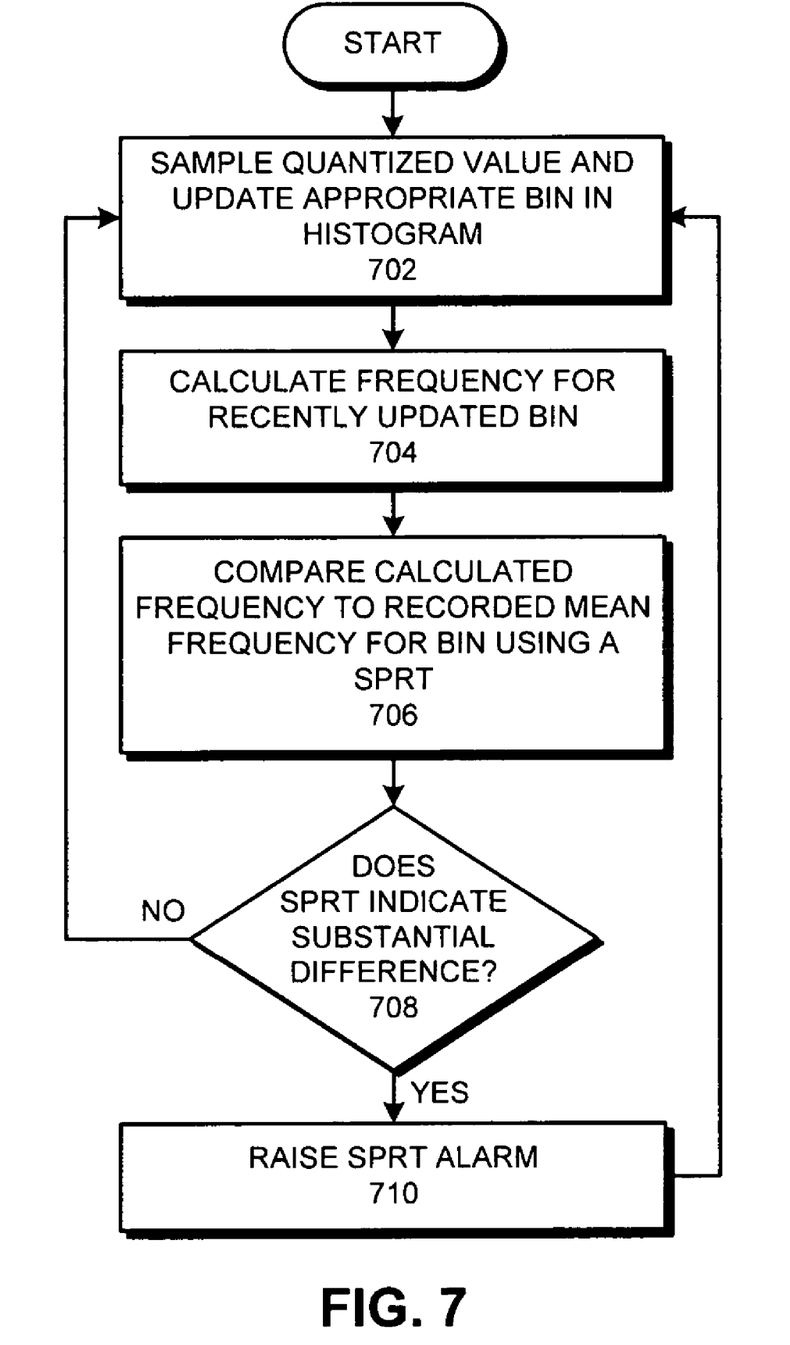
FIG. 7 presents a flowchart illustrating a "monitoring" process wherein changes in a distribution for a quantized signal are detected in accordance with an embodiment of the present invention.

FIGS. 5-7 present flowcharts illustrating the process of using moving histograms to detect changes in a quantized signal in a signal in accordance with an embodiment of the present invention.

FIG. 5 presents a flowchart illustrating a "blackout" process wherein the distribution of the signal is stabilized in accordance with an embodiment of the present invention. During operation, the system samples a quantized value and updates the moving histogram (step 502). Next, the system determines whether a time period for the blackout process has elapsed (step 504). If not (step 506—no), the system returns to step 502. Otherwise (step 506—yes), the system continues to the training process illustrated in FIG. 6. Note that the blackout process allows the distribution of sampled quantized values in the moving histogram to stabilize to a substantially stationary distribution. In one embodiment of the present invention, a 24-hour period is used for the blackout process.

FIG. 6 presents a flowchart illustrating a "training" process wherein the mean frequencies and the variances for the bins of the moving histogram are determined in accordance with an embodiment of the present invention. The process begins when the system calculates and records the mean frequency and variance for each bin in the moving histogram (step 602). Next, the system samples a quantized value and updates the moving histogram (step 604). The system then calculates and records the mean frequency and variance of the recently updated bin (step 606). Next, the system determines whether a time period for the training process has elapsed (step 608). If not (step 610—no), the system returns to step 604. Otherwise (step 610—yes), the system continues to. the monitoring process illustrated in FIG. 7. At the end of this training process, each bin has a reference distribution (i.e., a trained, or reference, mean frequency and variance). Thus, the training process facilitates accumulation of information about the reference distribution for each bin. One embodiment of the present invention uses a 30-hour period for the training process.

FIG. 7 presents a flowchart illustrating a "monitoring" process wherein changes in a distribution for a quantized signal are detected in accordance with an embodiment of the present invention. The process begins when the system samples a quantized value and updates the moving histogram (step 702). Next, the system calculates the frequency of the recently updated bin (step 704). The system then statistically compares the calculated frequency for the bin to the trained mean frequency for the bin (i.e., the mean frequency of the bin at the end of the training process) using a Sequential Probability Ratio Test (SPRT) (step 706).

To determine whether the calculated frequency for a bin is statistically different than the trained mean frequency for the bin (i.e., the signal is drifting), the following SPRT model can be used:

$$SPRT(i) = SPRT(i-1) + \left[ \frac{(x_i - M_0)^2}{2\sigma^2} - \frac{(x_i - M_1)^2}{2\sigma^2} \right] \quad (12)$$

where i represents the sample number of the newly sampled quantized value for a particular bin, $x_i$ represents the current frequency of the bin (i.e., the frequency of the bin calculated immediately after the sampling of quantized value i), $M_0$ represents the trained mean frequency, $M_1$ represents a mean bin frequency value considered to be bad, and $\sigma^2$ represents a trained variance for the bin (i.e., the variance of the bin at the end of the training process). Note that sequential testing techniques other than the SPRT can be used.

Note that equations (7) and (12) are different forms of the same SPRT equation. Equation (7) assumes a zero-mean $H_0$ time series (i.e., the baseline time series against which the monitored time series is compared), whereas equation (12) is a generalization wherein the mean of $H_0$ is $M_0$ and the mean of $H_1$ is $M_1$. In equation (7), only the mean of $H_1$ (i.e., M) is given, which means that the mean of $H_1$ is M units greater than the mean of $H_0$ (i.e., zero). In other words, using the nomenclature in equation (12), $M_1 = M_0 + M$, where $M_0 = 0$. Furthermore, note that equation (12) is a recursive expression for the SPRT, whereas equation (7) expresses the SPRT as a summation from time zero to the present.

The SPRT model expressed above provides a quantitative framework that enables one to decide between two hypotheses: $H_0$ and $H_1$, where $H_0$ represents a normal (e.g., Gaussian) distribution of frequencies of a particular bin with mean $M_0$ (the trained mean frequency), and where $H_1$ represents a normal (e.g., Gaussian) distribution of frequencies for that particular bin with mean $M_1$. As discussed above, $M_1$ represents a mean bin frequency considered to be "bad," or, in other words, indicating that the underlying variable is changing anomalously. $M_1$ may be chosen to have a certain absolute value or percentage difference from $M_0$. For example, if the trained mean frequency $M_0$ of a particular bin is 0.25, then one skilled in the art may set $M_1$ to be equal to $M_0 + 0.08$, or 0.33. In other embodiments of the present invention, for example, $M_1$ may be set to be equal to $M_0 + 8\%$ of $M_0$, or 0.27.

In other embodiments of the present invention, the value of $M_1$ may be dependent on $M_0$ plus a factor based on the trained variance (or standard deviation thereof). Thus, in certain embodiments, the $H_1$ mean frequency may be expressed in terms of the trained variance.

In one embodiment of the present invention, two SPRT calculations are performed for every new sampled quantized value: one to determine whether the underlying physical variable is "drifting up," and one to determine whether the underlying physical variable is "drifting down." When determining whether the underlying physical variable is drifting up, $M_1$ is set to be a specific absolute value or percentage which is higher than $M_0$. Similarly, when determining whether the underlying physical variable is drifting down, $M_1$ is set to be a specific absolute value or percentage which is lower than $M_0$. The value to which $M_1$ is set depends upon how wide a range of values a user considers acceptable. In other words, $M_1$ may be selectively set based on how sensitively a user wants to tune an acceptable input range of quantized values. Those skilled in the art will recognize that one or more other embodiments of the present invention may use SPRT models that test whether $M_1$ drifts up and/or whether $M_1$ drifts down with any number of calculations.

In one embodiment of the present invention, at least two SPRT calculations are performed for a bin whenever a newly sampled quantized value is of that bin value. To determine whether a calculated SPRT value indicates the underlying physical variable drifting, the calculated SPRT value is compared to values A and B from equation (2) above, where a represents an error tolerance of deciding $H_1$ (i.e., the distribution of frequencies for the bin with mean $M_1$) when $H_0$ (i.e., the distribution of frequencies for the bin with mean $M_0$) is true, and where β represents an error tolerance of deciding $H_0$ when $H_1$ is true. For example, in one embodiment of the present invention, a may be set to 0.001 and β may be set to 0.005.

If the calculated SPRT value is greater than B (step 708—yes), $H_1$ is held as being true (i.e., the frequencies for a particular bin accumulated during the monitoring phase are part of the $M_1$ distribution), thereby leading to the issuance of an SPRT alarm (step 710) which indicates the underlying physical variable is drifting.

In one or more other embodiments of the present invention, the monitoring process can be carried out indefinitely to detect subtle anomalies that may appear over time. In other words, the monitoring process is not limited to occurring within a predetermined period of time.

In embodiments of the present invention in which the monitoring process is limited to a predetermined period of time, the distribution of quantized values used for the monitoring process may reflect only a final period of time. For example, if the monitoring process is in the third week of operation, then, instead of considering the distribution of all quantized values sampled since the end of the training process (i.e., quantized values sampled for the three weeks), the monitoring process may only consider the distribution of all quantized values sampled during the last week. Those skilled in the art will recognize that such a technique may be referred to as a "sliding window" monitoring process.

For the case in which the calculated SPRT value is greater than A and less than B, $H_0$ is held as being weakly true. Such a case arises when an underlying physical variable seemingly starts to slowly "drift" but cannot be definitively determined as drifting for SPRT alarm purposes, which can be due in part to the set error tolerances discussed above.

Furthermore, in one embodiment of the present invention, if an underlying physical variable is determined to be drifting, an index for the physical variable may be calculated to determine how significantly the physical variable is drifting. Such a calculation may be a simple slope calculation which determines the slope of a line having one endpoint at the value of the physical variable at the end of the training process and another endpoint at the value of the physical variable when the physical variable is determined to be drifting.

EXAMPLE

An exemplary technique for detecting changes in a quantized signal in accordance with an embodiment of the present invention is provided below.

In this example, the blackout process has been completed and that the moving histogram for quantized values representing an underlying physical variable of interest is stable. Table 1 is associated with a particular bin in the moving histogram and shows the times t at which quantized values equal to the bin value are sampled during an exemplary training process.

TABLE 1

Values Observed During Training Process

| t | Frequency | Mean Frequency | Variance |
|---|---|---|---|
| 4 | 1/4 = .25 | .25 | — |
| 7 | 2/7 = .2857 | .2679 | .0003186 |
| 9 | 3/9 = .3333 | .2897 | .001164 |
| 13 | 4/13 = .3077 | .2942 | .0009342 |
| 17 | 5/17 = .2941 | .2942 | .0007474 |
| 20 | 6/20 = .3 | .2951 | .0006276 |
| 22 | 7/22 = .3182 | .2984 | .0006031 |
| 27 | 8/27 = .2963 | .2982 | .0005282 |

Each time a quantized value equal to the bin value is sampled, a frequency is determined by dividing the sample number by the number of total quantized values sampled (i.e., number of quantized values sampled including both quantized values equal to the bin value and quantized values that are not equal to the bin value). In this example, for purposes of simplicity, one quantized value is sampled for every t increment. Thus, as shown in Table 1, for example, at t=13, a quantized value equal to the bin value is sampled for a fourth time since the beginning of the training process, thereby leading to a frequency calculation of 4/13, or 0.3077.

After the frequency is calculated in response to a sampling of a quantized value equal to the bin value, a mean frequency and variance up to the point of the last sampled quantized value equal to the bin value is determined. For example, at t=13, the mean of the frequencies calculated in response to a sampling of a quantized value equal to the bin value up to and including the frequency calculated at t=13 is determined.

As shown in Table 1, at the end of the training process, the trained mean frequency is 0.2982 and the variance $\sigma^2$ is 0.0005282. Table 2 illustrates the various values associated with the particular bin over time in an exemplary monitoring process.

Each time a quantized that falls within a bin is sampled, a calculated frequency $x_i$ is determined, where i represents the order number of the quantized value sampled. For example, at t=7, the second instance (i=2) of a quantized which falls within the bin is sampled, thereby leading to a frequency calculation of 2/7, or 0.2857.

Next, a SPRT value for determining whether the underlying physical variable is drifting up is calculated using the SPRT model described above with reference to FIG. 7 (although not shown in Table 2, a SPRT value for determining whether the underlying physical variable is drifting down is also calculated). As shown in Table 2, $x_i$ is equal to the current mean frequency, $M_0$ is equal to the trained mean frequency 0.2982, $M_1$ has been selectively set to 0.3782 ($M_0$+0.08), and $\sigma^2$ is equal to the trained variance 0.0005282. Using the values of $x_i$, $M_0$, $M_1$, and $\sigma^2$ for each sampled quantized value that falls within the bin, a SPRT value is calculated. This SPRT value is then compared to the A and B values calculated according to the A and B formulas expressed above with reference to FIG. 7, where $\alpha$ is selectively set to 0.001 and $\beta$ is selectively set to 0.005, which leads to an A value of −5.297 and a B value of 6.903. Depending on the comparison of the calculated SPRT value to the A and B values, a determination is made as to whether the underlying physical variable is: (i) strongly good in view of the calculated being less than A, (ii) weakly good in view of the calculated being greater than A and less then B, or (iii) drifting in view of the calculated SPRT value being greater than B.

TABLE 2

Values Observed During Monitoring Process

| i | t | $x_i$ | $M_0$ | $M_1$ | $\sigma^2$ | SPRT(i) | A | B | Status |
|---|---|---|---|---|---|---|---|---|---|
| 1 | 4 | 1/4 = 0.25 | .2982 | .3782 | .0005282 | −13.359 | −5.297 | 6.903 | "good" (strong) |
| 2 | 7 | 2/7 = 0.2857 | .2982 | .3782 | .0005282 | −21.310 | −5.297 | 6.903 | "good" (strong) |
| 3 | 10 | 3/10 = 0.3 | .2982 | .3782 | .0005282 | −27.096 | −5.297 | 6.903 | "good" (strong) |
| 4 | 12 | 4/12 = 0.3333 | .2982 | .3782 | .0005282 | −27.838 | −5.297 | 6.903 | "good" (strong) |
| 5 | 15 | 5/15 = 0.3333 | .2982 | .3782 | .0005282 | −28.580 | −5.297 | 6.903 | "good" (strong) |
| 6 | 17 | 6/17 = 0.3529 | .2982 | .3782 | .0005282 | −26.354 | −5.297 | 6.903 | "good" (strong) |
| 7 | 19 | 7/19 = 0.3684 | .2982 | .3782 | .0005282 | −21.780 | −5.297 | 6.903 | "good" (strong) |
| 8 | 21 | 8/21 = 0.3809 | .2982 | .3782 | .0005282 | −15.312 | −5.297 | 6.903 | "good" (strong) |
| 9 | 23 | 9/23 = 0.3913 | .2982 | .3782 | .0005282 | −7.270 | −5.297 | 6.903 | "good" (strong) |
| 10 | 24 | 10/24 = 0.4167 | .2982 | .3782 | .0005282 | 4.620 | −5.297 | 6.903 | "good" (weak) |
| 11 | 26 | 11/26 = .4231 | .2982 | .3782 | .0005282 | 17.478 | −5.297 | 6.903 | "bad" |

In this example, the recursive SPRT calculations indicate that the underlying physical variable is not drifting up until t=24, at which point the SPRT calculation gives a weakly good status. At t=26, the calculated SPRT value exceeds B, thereby indicating that there is a statistically significant difference between the trained mean frequency and the frequency of the quantized value being sampled in the monitoring process. Accordingly, at this point, the underlying physical variable is determined to be bad in that it is drifting, or anomalously changing.

In the example above, values chosen for the various variables are merely illustrative and do not limit the scope of the present invention.

In one embodiment of the present invention, a technique for detecting changes in quantized signals allows a user to detect subtle changes in an underlying physical variable of a computing system in advance of a potential failure that may have occurred had the subtle change not been detected.

Furthermore, in one embodiment of the present invention, this technique may be used even when signals reporting the value of the physical variable are highly quantized.

Additionally, in one embodiment of the present invention, this technique may be selectively modified to increase or decrease the range of an acceptable distribution associated with the quantized sampling of a physical variable.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using statistical techniques to selectively transmit data from a sensor, comprising:
   receiving a sequence of quantized values from the sensor; and
   for each quantized value in the sequence of quantized values,
      updating a bin of a histogram that is associated with the quantized value to indicate that the quantized value was observed;
      calculating a frequency for the bin;
      determining whether the calculated frequency for the bin has deviated by a specified amount from a mean frequency for the bin by using a Sequential Probability Ratio Test (SPRT), wherein the SPRT is applied to each bin in the histogram; and
      if so,
         determining that the sensor is observing a real event; and
         transmitting sensor data for the real event to a receiver.

2. The method of claim 1, wherein the SPRT includes at least one of:
   a positive-mean test, which tests whether the mean of a time-series for the inferential variable is above a reference level;
   a negative-mean test, which tests whether the mean of the time-series for the inferential variable is below a reference level;
   a nominal-variance test, which tests whether the variance of the time-series for the inferential variable is proportional to a scale factor;
   a inverse-variance test, which tests whether the variance of the time-series for the inferential variable is proportional to the inverse of the scale factor;
   a positive first-difference test, which tests whether the time-series for the inferential variable is increasing;
   a negative first-difference test, which tests whether the time-series for the inferential variable is decreasing;
   a positive first-difference variance test, which tests whether the first difference of the variance of the time-series is increasing; or
   a negative first-difference variance test, which tests whether the first difference of the variance of the time-series is decreasing.

3. The method of claim 1, wherein prior to determining whether the calculated frequency has deviated by the specified amount from the mean frequency, the method further comprises determining the mean frequency and a variance for the quantized value by:
   observing a sequence of quantized values during a training phase, wherein the sensor observes background variations during the training phase;
   for each quantized value in the sequence of quantized values,
      updating a bin of the histogram that is associated with the quantized value to indicate that the quantized value was observed; and
      calculating a mean frequency and a variance for the bin.

4. The method of claim 1, wherein the sensor is located on a smart mote, which measures and preprocesses physical variables, and transmits the resulting data wirelessly to a receiver.

5. A computer-readable storage medium storing instructions that when executed by a computer cause the computer to perform a method for using statistical techniques to selectively transmit data from a sensor, wherein the method comprises:
   receiving a sequence of quantized values from the sensor; and
   for each quantized value in the sequence of quantized values,
      updating a bin of a histogram that is associated with the quantized value to indicate that the quantized value was observed;
      calculating a frequency for the bin;
      determining whether the calculated frequency for the bin has deviated by a specified amount from a mean frequency for the bin by using a Sequential Probability Ratio Test (SPRT), wherein the SPRT is applied to each bin in the histogram; and
      if so,
         determining that the sensor is observing a real event; and
         transmitting sensor data for the real event to a receiver.

6. The computer-readable storage medium of claim 5, wherein the SPRT includes at least one of:
   a positive-mean test, which tests whether the mean of a time-series for the inferential variable is above a reference level;
   a negative-mean test, which tests whether the mean of the time-series for the inferential variable is below a reference level;
   a nominal-variance test, which tests whether the variance of the time-series for the inferential variable is proportional to a scale factor;
   a inverse-variance test, which tests whether the variance of the time-series for the inferential variable is proportional to the inverse of the scale factor;
   a positive first-difference test, which tests whether the time-series for the inferential variable is increasing;
   a negative first-difference test, which tests whether the time-series for the inferential variable is decreasing;
   a positive first-difference variance test, which tests whether the first difference of the variance of the time-series is increasing; or a negative first-difference variance test, which tests whether the first difference of the variance of the time-series is decreasing.

7. The computer-readable storage medium of claim 5, wherein prior to determining whether the calculated frequency has deviated by the specified amount from the mean frequency, the method further comprises determining the mean frequency and a variance for the quantized value by:
   observing a sequence of quantized values during a training phase, wherein the sensor observes background variations during the training phase;
   for each quantized value in the sequence of quantized values,
      updating a bin of the histogram that is associated with the quantized value to indicate that the quantized value was observed; and
      calculating a mean frequency and a variance for the bin.

8. The computer-readable storage medium of claim 5, wherein the sensor is located on a smart mote, which measures and preprocesses physical variables, and transmits the resulting data wirelessly to a receiver.

9. An apparatus that uses statistical techniques to selectively transmit data from a sensor, comprising:
   the sensor, which produces a sequence of quantized values;
   a processor which is configured to:
      for each quantized value in the sequence of quantized values,
         update a bin of a histogram that is associated with the quantized value to indicate that the quantized value was observed;
         calculate a frequency for the bin;
         determine whether the calculated frequency for the bin has deviated by a specified amount from a mean frequency for the bin by using a Sequential Probability Ratio Test (SPRT), wherein the SPRT is applied to each bin in the histogram; and
         if so, determine that the sensor is observing a real event; and
   a transmitter, wherein if the distribution indicates that the sensor is observing a real event, the transmitter is configured to transmit sensor data for the real event to a receiver.

10. The apparatus of claim 9, wherein the SPRT includes at least one of:
   a positive-mean test, which tests whether the mean of a time-series for the inferential variable is above a reference level;
   a negative-mean test, which tests whether the mean of the time-series for the inferential variable is below a reference level;
   a nominal-variance test, which tests whether the variance of the time-series for the inferential variable is proportional to a scale factor;
   a inverse-variance test, which tests whether the variance of the time-series for the inferential variable is proportional to the inverse of the scale factor;
   a positive first-difference test, which tests whether the time-series for the inferential variable is increasing;
   a negative first-difference test, which tests whether the time-series for the inferential variable is decreasing;
   a positive first-difference variance test, which tests whether the first difference of the variance of the time-series is increasing; or
   a negative first-difference variance test, which tests whether the first difference of the variance of the time-series is decreasing.

11. The apparatus of claim 9, wherein prior to determining whether the calculated frequency has deviated by the specified amount from the mean frequency, the processor is configured to determine the mean frequency and a variance for the quantized value by:
   observing a sequence of quantized values during a training phase, wherein the sensor observes background variations during the training phase;
   for each quantized value in the sequence of quantized values,
      updating a bin of the histogram that is associated with the quantized value to indicate that the quantized value was observed; and
      calculating a mean frequency and a variance for the bin.

12. The apparatus of claim 9, wherein the sensor is located on a smart mote, which measures and preprocesses physical variables, and transmits the resulting data wirelessly to a receiver.

* * * * *